United States Patent [19]

Hirose

[11] 4,171,066

[45] Oct. 16, 1979

[54] AUTOMATIC VENDING MACHINE CAPABLE OF HEATING VENDED GOODS

[75] Inventor: Kiyoshi Hirose, Ikoma, Japan

[73] Assignee: Matsushita Reiki Co., Ltd., Osaka, Japan

[21] Appl. No.: 795,868

[22] Filed: May 11, 1977

[30] Foreign Application Priority Data

| | | | |
|---|---|---|---|
| May 17, 1976 | [JP] | Japan | 51-56904 |
| May 17, 1976 | [JP] | Japan | 51-56905 |
| May 17, 1976 | [JP] | Japan | 51-56906 |
| Jun. 15, 1976 | [JP] | Japan | 51-78512[U] |
| Sep. 20, 1976 | [JP] | Japan | 51-127112[U] |
| Sep. 27, 1976 | [JP] | Japan | 51-116414 |
| Sep. 30, 1976 | [JP] | Japan | 51-132483[U] |

[51] Int. Cl.[2] .......... A47J 27/14

[52] U.S. Cl. .......... 221/150 A; 99/357; 219/10.73; 221/192; 221/261

[58] Field of Search .......... 221/150 A, 150 HC, 192, 221/233, 261, 291; 99/357, 359; 219/10.49, 10.73

[56] References Cited

U.S. PATENT DOCUMENTS

| | | | |
|---|---|---|---|
| 2,363,724 | 11/1944 | Ford | 221/150 A |
| 2,484,865 | 10/1949 | Strickland | 219/10.73 |
| 2,831,419 | 4/1958 | Timm | 221/150 A |
| 2,945,935 | 7/1960 | Messner et al. | 219/10.41 |
| 3,335,656 | 8/1967 | Smith | 221/150 HC X |
| 3,836,325 | 9/1974 | Nakamura et al. | 219/10.73 X |

*Primary Examiner*—Francis J. Bartuska

*Attorney, Agent, or Firm*—Burgess, Ryan and Wayne

[57] ABSTRACT

An automatic vending machine which selectively delivers a cold stored canned food such as canned coffee, juice, soup and so on as it is or canned food after being heated by an induction heating coil.

18 Claims, 6 Drawing Figures

AUTOMATIC VENDING MACHINE CAPABLE OF HEATING VENDED GOODS

BACKGROUND OF THE INVENTION

The present invention relates to an automatic vending machine capable of selectively serving a cold or hot canned food.

It is well known to those skilled in the art that a variety of automatic vending machines which deliver goods such as coffee, juice, soup and so on after heating them have been long used and that the cold storage of the goods to be sold keeps them fresh for a long time. However in the prior art automatic vending machines of the type described containing a stock of goods to be sold in general employ goods which are stored in a hot storage chamber, so that the quality of some goods may be guaranteed only a few days. Furthermore the hot-storage, automatic vending machines have not been adapted to both sell a variety of goods but also to serve the goods which have been cooled or are maintained at room temperature, so that they cannot be used throughout the year regardless of the season.

SUMMARY OF THE INVENTION

In view of the above, one of the objects of the present invention is to provide an automatic vending machine of the type in which a vended canned food such as canned coffee, juice, soup and so on is heated if a purchaser so desires and is turned upside down before delivery so that its content may be well mixed to a uniform temperature.

A second object of the present invention is to provide an automatic vending machine of the type in which a stock of canned food is cold stored and a vended canned food is heated to a desired temperature by an induction heating coil in which a magnetic field is formed by feeding high frequency wave current and eddy-current loss and hysteresis loss are produced only in the iron shell of the sold canned food store before delivery so that the shelf life of the canned food may be considerably improved.

A third object of the present invention is to provide an automatic vending machine of the type in which an induction heating coil is used for heating a sold canned good in order to eliminate harmful effects on human health and to avoid a fire.

A fourth object of the present invention is to provide an automatic vending machine of the type in which an induction heating coil is used for heating a sold canned food so that not only the automatic vending machine may be made very simple in construction but also the heating time thereof may be considerably shortened.

A fifth object of the present invention is to provide an automatic vending machine of the type in which the content of a sold can may be heated in an effective and rational manner to a uniform temperature.

A sixth object of the present invention is to provide an automatic vending machine of the type described which is further improved so that a sold canned food may be easily inserted into the induction heating coil for heating.

A seventh object of the present invention is to provide an automatic vending machine of the type described which is so further improved that a sold canned food may be selectively served cold or hot.

An eighth object of the present invention is to provide a door of an automatic vending machine which is provided with a heating chamber for heating a sold canned food if a purchaser so desires and which may replace the door of a conventional cold-storage type automatic vending machine so that the existing cold-storage type automatic vending machines may be converted to the automatic vending machines capable of selectively serving a cold or hot canned food.

To the above and other ends, the present invention provides an automatic vending machine comprising a cabinet, a storage space in said cabinet for storing therein a stock of canned food for sale, a goods discharge device or dispenser responsive to a control signal for permitting the delivery of one selected canned food from said storage space, heating means for heating canned food when delivered therein, transfer means for transferring the heated can food from said heating means to a delivery opening, and turning means for turning upside down the canned food when the latter is transferred by said transfer means to said delivery opening.

BRIEF DESCRIPTION OF THE DRAWINGS

The same reference numerals are used throughout the figures.

DESCRIPTION OF THE PREFERRED EMBODIMENTS

Figure 1:
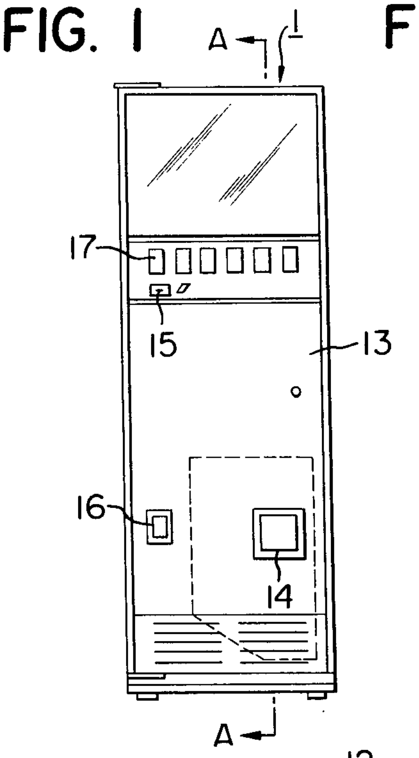
FIG. 1 is a schematic front view of an automatic vending machine in accordance with the present invention.
Figure 2:
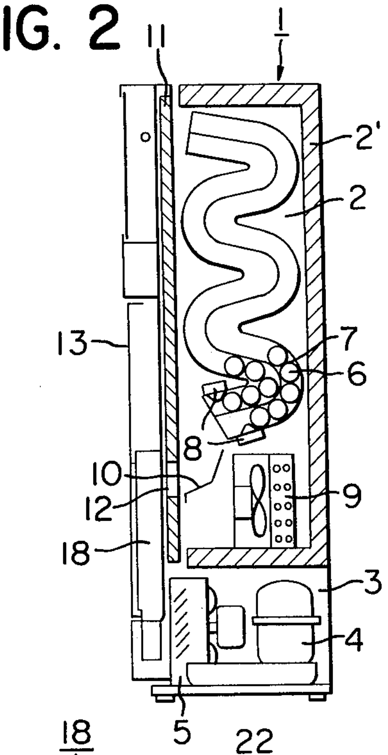
FIG. 2 is a sectional view taken along the line A—A of FIG. 1.
Figure 3:
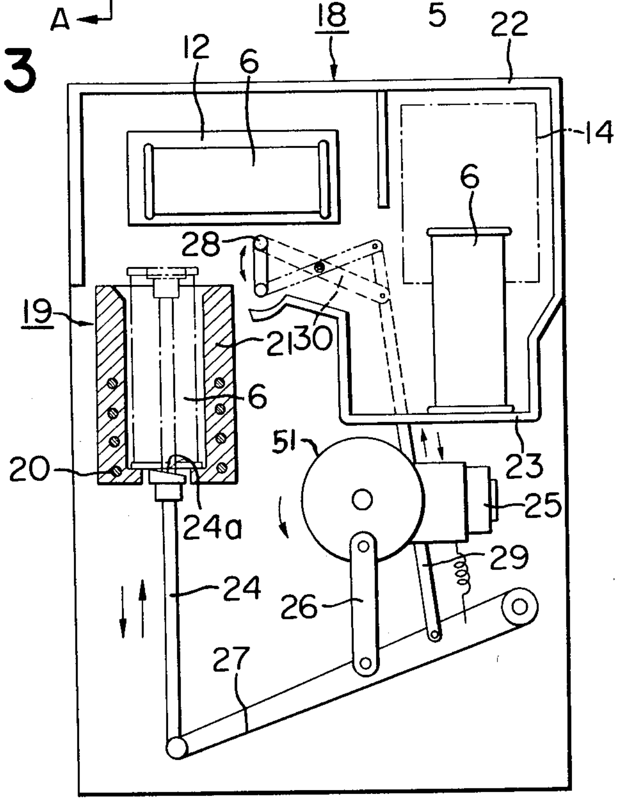
FIG. 3 is a front view, partly in section and on enlarged scale, of a heating chamber of the automatic vending machine.

Referring to FIGS. 1–3, an automatic vending machine 1 in accordance with the present invention is divided in general into an insulated storage space 2 and a machine space 3 below the storage space 2 in which are housed a motor-driven compressor 4 and a condenser 5 forming a cooling cycle. Disposed within the insulated storage space 2 are a plurality of serpentine columns 7 each containing a plurality of canned food 6 such as canned coffee, juice, soup and so on which are selectively sold by a merchandise discharge device or dispenser 8 which is well known in the art and is not the subject matter of the present invention so that no detailed description shall be made in this specification. An evaporator 9 for cooling the stock of canned food 6 is disposed at the lower portion of the storage space 7 so that the canned food 6 may be stored fresh for a long time.

The selected canned food 6 is discharged by the discharge device or dispenser 8 and is guided by a guide 10 to an opening 12 formed at an auxiliary or inner door 11 and then to a delivery opening 14 at a main or outer door 13. The inner door 11 which covers the front side of the insulated storage space 2 is hinged to one side of the outer door 13 and includes an insulation wall. The main or outer door 13 is provided with a coin slot 15, a coin return opening 16 and goods selection buttons 17. A goods heating chamber 18 is attached to the rear side of the outer door 13 and offset to one lateral side thereof and is communicated with the opening 12 of the inner door 11. The most important advantage of attaching the heating chamber 18 to the main or outer door 13 is that the outer door 13 with the heating chamber 18 may replace the door of an existing automatic vending machine so that the latter may be easily converted into an automatic vending machine capable of heating the vended goods.

A heating compartment 19 is disposed within the heating chamber 18 and has an induction heating coil 20. Since the induction heating coil 20 forms a high frequency magnetic field within the coil in response to high frequency wave current, the iron shell of the canned food 6 contained in the induction heating coil 20 produces eddy-current loss and hysteresis loss due to interaction with the magnetic field and the canned food 6 is heated by the heat produced by the eddy-current loss and hysteresis loss. More particularly the heating compartment 19 consists of a coiled copper wire or induction heating coil 20 embedded or molded in an insulating material such as epoxy resin or the like. The advantages of the use of the molded induction heating coil 20 are that it may be installed in a very simple manner and that malfunction or nonuniform distribution of the magnetic field due to change in pitch of the induction heating coil 20 may be prevented.

The heating chamber 18 has a frame 22 surrounding the openings 12 and 14, and the opening 14 has a receptacle 23 for receiving a canned food 6 which opening communicates with the opening 12 through a goods guide or passage.

The heating chamber 18 includes a discharge or transfer means consisting of first and second links 26 and 27 and a pusher 24*a* operated by a push rod 24 for discharging the heated canned food out of the heating compartment 19. One end of the second link 27 is pivoted to a wall of the heating chamber 18 while the other end is pivoted to the lower end of the push rod 24. The first link 26 has its upper end pivoted to a disk 51 at a position offset from its center, and the disk 51 is rotated in either direction by driving means or motor 25 so that the pusher 24*a* may vertically move through the heating compartment 19. The lower end of the link 26 is pivoted to the link 27 intermediate the ends thereof. The upper surface of the pusher 24*a* is inclined toward the delivery opening 14 so that when the heated can 6 is lifted a predetermined stroke through the heating compartment by the pusher 24*a*, it is inclined toward the delivery opening 14 and is turned upside down as it is further pushed upward, onto the guide. The heated canned food 6 slides on the guide into the receptacle 23 and stands upright as best shown in FIG. 3. Thus the discharge or transfer means serves also as a means for turning the heated can 6 upside down so that its content may be well mixed to have a uniform temperature.

The heating chamber 18 further includes a can guide means or linkage consisting of first and second links 29 and 30 and a guide pin 28. The lower end of the first link 29 is pivoted to the second link 27 of the discharge linkage while the other end is pivoted to one end of the second link 30 which is extended through the passage between the openings 12 and 14 and is pivoted at a point intermediate its ends to the wall of the heating chamber 18 and has the other end pivoted to the guide pin 28. Thus the can guide linkage operates in unison with the can discharge and turning linkage. That is, when the pusher 24*a* of the can discharge and turning linkage is at its lower position, the guide pin 28 which is fitted into a vertical guide slot for vertical movement is at its upper position so that it may make contact with the can delivered through the opening 12, causing it to incline, turn upside down and drop into the heating compartment 19. When the pusher 24*a* is raised to discharge the heated can 6, the guide pin 28 is brought to its lower position so that it may not interfer the transfer of the heated can 6 from the heating compartment 19 to the receptacle 23.

When a canned food is selected to be served cold, the pusher 24*a* is raised to and held at the upper end of the heating compartment 19 while the guide pin 28 is held at its lower position so that the can discharged through the opening 12 is pushed by the inclined surface of the pusher 24*a* to incline toward the receptacle 23. As a result, the can slides over the guide and falls into the receptacle 23 to stand upright.

Figure 4:
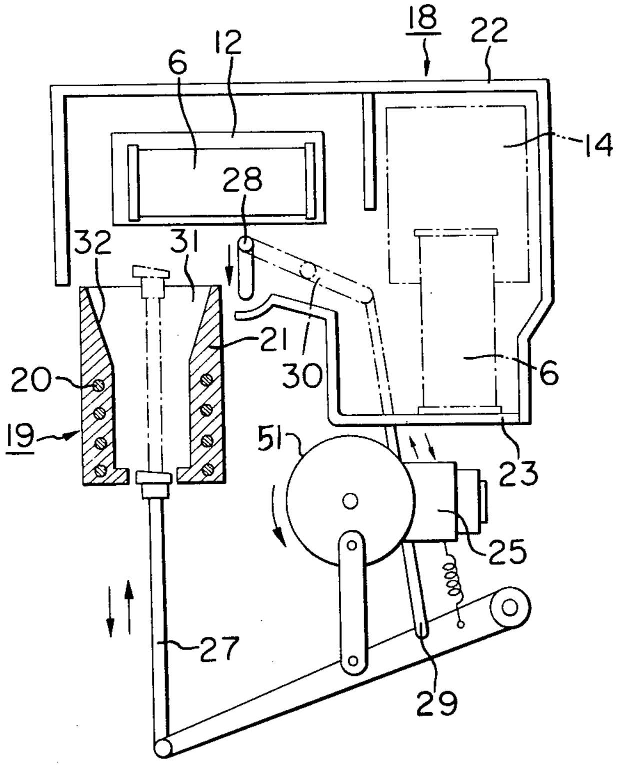
FIG. 4 is a view similar to FIG. 3 but illustrating a modification of the heating chamber.

Next a modification of the heating compartment 19 will be described with reference to FIG. 4. The upper opening of the cylindrical heating compartment 19 is tapered as indicated at 31 in FIG. 4 so that the can discharged through the opening 12 may be smoothly fed into the heating compartment 19.

Figure 5:
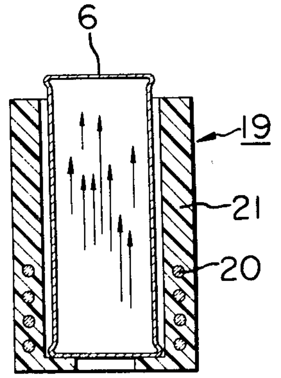
FIGS. 5 and 6 are views used for the explanation of heating a canned food by an induction heating coil.
Figure 6:
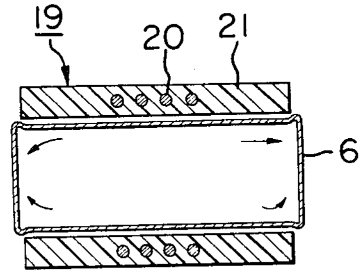

The advantages of the upright heating compartment 19 will be described with reference to FIGS. 5 and 6. In the upright heating compartment shown in FIG. 5, the induction heating coil 20 is molded in the lower portion of the insulation cylinder 21, but the heating compartment 19 shown in FIG. 6 is held in the horizontal position and the induction heating coil 20 is molded at the center portion of the insulation cylinder 21 so that when the can is heated its content flows by convection in the directions indicated by the arrows. However the can itself is heated, and when it is held upright after heating, the temperature of its content is considerably different between the upper and lower portions. However, when the heating compartment 19 is held in upright position and the induction heating coil 20 is placed at the lower portion of the insulating cylinder 21, the heating of the upper portion of the can may be prevented. In addition, the height of the induction heating coil 20 is lower than the height of the can so that the heated content which flows upward by convection may be avoided to be heated again and consequently the content may be uniformly heated.

Next the mode of operation of the automatic vending machine with the above construction will be described. First, a purchaser drops a predetermined number of coins into the coin slot 15 and then pushes one of the selection buttons 17 which causes the automatic vending machine to serve a hot or heated canned food. Then the discharge device or dispenser 8 in the storage space 7 is actuated to deliver one cold can 6, which slides over the guide 10 to the opening 12. Simultaneous with this discharge operation, the driving means or motor 25 is energized to drive the discharge or transfer and turning linkage as well as the guide linkage so that the guide pin 28 of the guide linkage may be held at the upper position while the pusher 24*a* of the discharge and turning linkage may be held in the lower position. The can delivered from the opening 12 strikes against the guide pin 28 and is caused to drop into the heating compartment 19 in the heating chamber 18. When the can is completely inserted into the heating chamber, a senser such as a switch (not shown) is actuated to output a signal to a timer (not shown) which in turn causes the high frequency current to flow through the induction heating coil 20 for a predetermined time to heat the can. When the can is heated to a desired temperature, the driving means or motor 25 is energized so that the pusher 24a is raised to push the heated can upward while the guide pin 28 is brought to the lower position. As the heated can is pushed upward, it gradually inclines toward the receptacle 23 and is turned upside down as it emerges out of the heating compartment 19 so that its content is mixed to a uniform temperature in the manner described elsewhere. The heated can slides over the guide into the receptacle 23 and stands upright to be taken out by the purchaser through the delivery opening 14.

When the purchaser pushes one of the selection buttons 17 which causes the automatic vending machine to serve a cold can 6, the can discharge and turning means or linkage as well as the guide means or linkage are actuated so that the pusher 24a is moved upward to its upper position above the upper end of the heating compartment 19 and the guide pin 28 is caused to move downward to its lower position while the dispenser 8 delivers one can 6 through the opening 12 into the heating chamber 18. Then the cold can 6 is inclined toward the receptacle 23 to slide over the guide into the receptable 23 and stands upright to be taken out by the purchaser in the manner described elsewhere.

What is claimed is:

1. An automatic vending machine capable of selectively heating a vended canned food, comprising:

(a) a cabinet, (b) a storage space in said cabinet for storing there a number of food cans, said food cans are cylindrical with parallel end surfaces and a longitudinal axis perpendicular to said end surfaces, (c) a goods dispenser responsive to a control signal to permit the delivery of one selected food can from said storage space, (d) heating means for vertically receiving the upper portion and lower portion of a canned food and heating said food can when delivered therein, (e) transfer means for transferring the heated food can from said heating means to a delivery opening, and (f) turning means for inverting the heated food can to reverse the positions of the upper and lower portions of the canned food including means for turning said heated can end for end by rotating the can about an axis substantially perpendicular to the longitudinal axis of the can when the latter is transferred by said transfer means, thereby improving the uniformity of heat distribution within the heated can.

2. An automatic vending machine as set forth in claim 1 wherein said heating means has an opening through which the canned food is charged into and discharged out of said heating means, and an induction heating coil for heating the canned food charged into said heating means.

3. An automatic vending machine as set forth in claim 1 wherein said means for turning upside down a canned food comprises (a) pushing means for pushing upward a canned food through said heating means toward said delivery opening, and (b) driving means for causing the vertical movement of said pushing means.

4. An automatic vending machine as set forth in claim 2 further comprising a guide means responsive to a control signal for selectively guiding a canned food delivered from said goods discharge device or dispenser into said heating means or said delivery opening.

5. An automatic vending machine as set forth in claim 2 wherein said means for turning upside down a canned food comprises (a) pushing means for pushing upward a canned food through said heating means, and (b) driving means for causing the vertical movement of said pushing means.

6. An automatic vending machine as set forth in claim 2 further comprising a guide means responsive to a control signal for selectively guiding a canned food delivered from said goods discharge device or dispenser into said heating means or said delivery opening, and wherein said means for turning upside down a canned food comprises (a) pushing means for pushing upward a canned food through said heating means, and (b) driving means for causing the vertical movement of said pushing means.

7. An automatic vending machine as set forth in claim 1 further comprising guide means responsive to a control signal for selectively guiding the canned food delivered from said goods dispenser into said heating means or said delivery opening, said heating means having an opening through which said canned food is charged into and discharged out of said heating means, and an induction heating coil in which a magnetic field is formed by supplying high frequency current thereto and the canned food charged into said heating means is heated by the heat due to eddy-current loss and hysteresis loss produced by the magnetic field.

8. An automatic vending machine as set forth in claim 7 wherein said means for turning upside down a canned food comprises (a) pushing means for pushing upward a canned food through said heating means, and (b) driving means for causing the vertical movement of said pushing means.

9. An automatic vending machine as set forth in claim 3, further comprising a guide means responsive to a control signal for selectively guiding a canned food delivered from said goods dispenser into said heating means or said delivery opening.

10. An automatic vending machine as set forth in claim 3, wherein said heating means has an opening through which said canned food is charged into and discharged out of said heating means, and an induction heating coil in which a magnetic field is formed by supplying high frequency current thereto and the canned food charged into said heating means is heated by the heat due to eddy-current loss and hysteresis loss produced by the magnetic field.

11. An automatic vending machine as set forth in claim 2, wherein the axis of said induction heating coil is vertically arranged in a heating compartment.

12. An automatic vending machine as set forth in claim 2, wherein said induction heating coil has a height lower than a canned food inserted therein, and is disposed in opposed relationship with the lower portion of a canned food inserted therein.

13. An automatic vending machine as set forth in claim 2, wherein said induction heating coil is molded in a thermally insulating resin.

14. An automatic vending machine as set forth in claim 2, wherein said opening of said heating means is tapered upward with the diameter thereof being gradually increased.

15. An automatic vending machine as set forth in claim 2, wherein said heating means is mounted on the door of said cabinet.

16. An automatic vending machine capable of selectively heating a sold canned food comprising (a) a cabinet, (b) a storage space in said cabinet for storing therein a large number of canned food, (c) a goods discharge device or dispenser responsive to a control signal to permit the delivery of one selected canned food from said storage space, (d) heating means for heating a canned food when delivered therein, (e) transfer means for transferring the heated canned food from said heating means to a delivery opening, (f) turning means for turning upside down the canned food when the latter is transferred from said heating means to said delivery opening by said transfer means, (g) guide means responsive to a control signal for selectively guiding the canned food delivered from said goods discharge device or dispenser into said heating means or into said delivery opening, (h) said heating means having an opening through which a canned food delivered from said goods discharge device or dispenser is charged into said heating means and through which the heated canned food is discharged out of said heating means, and an induction heating coil for heating the canned food charged into said heating means, (i) said turning means for turning upside down a canned food comprising
pushing means for pushing upward a canned food through said induction heating coil and inclining it toward said delivery opening, and driving means for causing the vertical reciprocal movement of said pushing means, (j) said induction heating coil being held upright and in opposed relationship to the lower portion of a canned food inserted therein, (k) said induction heating coil having a height lower than a canned food, (l) said induction heating coil being molded in a thermally insulating resin, and (m) said opening of said heating means being tapered upward with the diameter being gradually increased.

17. An automatic vending machine as set forth in claim 16, wherein said heating means is mounted on the door of said cabinet.

18. An automatic vending machine as set forth in claim 16, wherein said heating means is mounted on said cabinet.

* * * * *